United States Patent
Bruel et al.

(10) Patent No.: US 11,699,349 B2
(45) Date of Patent: Jul. 11, 2023

(54) ELECTRONIC EXOCENTRIC SYMBOL DISPLAY DEVICE AND ASSOCIATED DISPLAY METHOD AND COMPUTER PROGRAM PRODUCT

(71) Applicant: THALES, Courbevoie (FR)

(72) Inventors: Emilie Bruel, Merignac (FR); Nicolas Lepron, Merignac (FR); Daniel Maulet, Merignac (FR)

(73) Assignee: THALES, Courbevoie (FR)

( * ) Notice: Subject to any disclaimer, the term of this patent is extended or adjusted under 35 U.S.C. 154(b) by 120 days.

(21) Appl. No.: 17/318,847

(22) Filed: May 12, 2021

(65) Prior Publication Data
US 2021/0366294 A1 Nov. 25, 2021

(30) Foreign Application Priority Data

May 19, 2020 (FR) ...................................... 20 05009

(51) Int. Cl.
| | |
|---|---|
| *B64D 45/00* | (2006.01) |
| *B64C 27/00* | (2006.01) |
| *G01C 5/00* | (2006.01) |
| *G08G 5/02* | (2006.01) |
| *G08G 5/00* | (2006.01) |
| *G01C 23/00* | (2006.01) |

(52) U.S. Cl.
CPC ......... *G08G 5/0021* (2013.01); *G01C 23/005* (2013.01); *G08G 5/0086* (2013.01); *G08G 5/025* (2013.01)

(58) Field of Classification Search
None
See application file for complete search history.

(56) References Cited

U.S. PATENT DOCUMENTS

| | | | |
|---|---|---|---|
| 2004/0183697 A1* | 9/2004 | Rogers | G01C 23/00 340/971 |
| 2009/0138138 A1 | 5/2009 | Ferren et al. | |
| 2010/0023189 A1* | 1/2010 | Suddreth | G01C 23/00 701/16 |

(Continued)

FOREIGN PATENT DOCUMENTS

EP 3502844 A1 6/2019

OTHER PUBLICATIONS

French Search Report, from the French Patent Office in counterpart French Application No. 2005009, dated Feb. 2, 2021.

*Primary Examiner* — Adam D Tissot
*Assistant Examiner* — Michael T Silva
(74) *Attorney, Agent, or Firm* — ArentFox Schiff LLP

(57) ABSTRACT

The invention relates to an electronic display device on board an aircraft capable of landing or maintaining a hover above a landing zone and comprising:
 a module for calculating a distance between the aircraft and the landing zone according to a horizontal direction and for determining a height of the aircraft; and
 a module for displaying an exocentric aircraft symbol, positioned at a distance said exocentric from the aircraft according to an exocentric direction and at a height difference said exocentric relative to the aircraft, the display module being further configured to display an exocentric landing zone symbol, positioned at a distance from the landing zone equal to the exocentric distance according to the exocentric direction and at the same height as the exocentric aircraft symbol.

10 Claims, 6 Drawing Sheets

(56) References Cited

U.S. PATENT DOCUMENTS

| | | | |
|---|---|---|---|
| 2010/0156758 A1* | 6/2010 | Anders | G01C 23/005 |
| | | | 701/16 |
| 2012/0314032 A1* | 12/2012 | Muensterer | G01S 7/51 |
| | | | 348/46 |
| 2015/0259075 A1* | 9/2015 | Case | B64C 27/00 |
| | | | 701/4 |
| 2016/0140850 A1* | 5/2016 | Feyereisen | G08G 5/0078 |
| | | | 701/532 |
| 2018/0222602 A1* | 8/2018 | Salesse-Lavergne | ......... |
| | | | B64C 27/57 |
| 2020/0020238 A1* | 1/2020 | Baudry | G08G 5/025 |

* cited by examiner

ELECTRONIC EXOCENTRIC SYMBOL DISPLAY DEVICE AND ASSOCIATED DISPLAY METHOD AND COMPUTER PROGRAM PRODUCT

CROSS-REFERENCE TO RELATED APPLICATIONS

This application is a U.S. non-provisional application claiming the benefit of French Application No. 20 05009, filed on May 19, 2020, which is incorporated herein by reference in its entirety.

FIELD OF THE INVENTION

The present invention relates to an electronic device for displaying exocentric symbols on a display system adapted to be embarked in an aircraft.

The present invention also relates to a method for displaying exocentric symbols on the display system.

The present invention also relates to a computer program product comprising software instructions which, when implemented by computer equipment, implement such a display method.

The invention relates more particularly to a helicopter, while being applicable to any type of aircraft, such as an airplane or a drone.

The invention relates in particular to assist in the landing of the aircraft on a landing zone. This assistance is particularly useful to the pilot when the landing zone is located on any terrain, outside an aerodrome for example, and when the visualization conditions of the landing zone are degraded, for example at night or in case of degraded weather conditions.

The invention also relates to assistance in maintaining a hover, for example in the case of lifting of equipment or persons. In this case, the aid is particularly useful to the pilot when the ground height does not allow the pilot to recover visual markers to maintain stationary flight.

BACKGROUND

It is known to show a two-dimensional representation in a horizontal plane of the aircraft and the landing zone with a display of the distance between the aircraft and the landing zone. However, this representation is not fully satisfactory because it requires a significant cognitive overload for the pilot and does not show the height of the aircraft in relation to the terrain. This overload is even greater when this representation is shown on a head-up display screen and is superimposed on the view of the outside terrain.

It is also known to show a compliant three-dimensional representation of the landing zone. In particular, a head-up display system allows this representation to be shown on a transparent surface in front of the pilot.

By compliant representation, one understands a cartographic and symbolic representation which is superimposed exactly on the ground effectively seen by the pilot.

However, this method also presents disadvantages. Indeed, when the aircraft is close to the landing zone, the latter is found under the aircraft and the pilot is obliged to carry out important head movements to see this representation. This then leads to a lack of concentration of the pilot on the landing itself and also a risk of disorientation of the pilot. Moreover, the three-dimensional representation interferes with a direct view of the landing zone by the pilot.

SUMMARY

The object of the invention is thus to propose an electronic display device allowing a more intuitive landing for the pilot, making it possible to reduce the cognitive load of the pilot while not obstructing the sight of the landing zone.

To this end, the invention has as its object an electronic device for displaying exocentric symbols on a display system, the electronic display device and the display system being suitable for being embarked in an aircraft, the aircraft being suitable for flying over a terrain and landing on a landing zone of the terrain or for maintaining a stationary flight over this landing zone, the electronic display device comprising: a calculation module configured to calculate a distance between the aircraft and the landing zone according to a horizontal direction orthogonal to a vertical direction and to determine a height of the aircraft relative to the terrain; and a display device configured to display on the display system an exocentric aircraft symbol positioned at a said exocentric distance from the aircraft according to an exocentric direction and at an difference in height, said exocentric relative to the aircraft according to the vertical direction, the exocentric aircraft symbol being disposed between the terrain and the aircraft according to the vertical direction, the display device being further configured to display a first exocentric landing zone symbol, positioned at a distance from the landing zone equal to the exocentric distance according to the exocentric direction and at the same height as the exocentric aircraft symbol according to the vertical direction, the distance between the exocentric aircraft symbol and the first exocentric landing zone symbol according to the horizontal direction being equal to the distance between the aircraft and the landing zone according to the horizontal direction.

Thus, with the electronic display device according to the invention, the pilot can see, on a display system, whether head up or head down, relative to the three-dimensional positions of the aircraft and the landing zone without interfering with the visualization of the landing zone due to the exocentricity. The exocentric symbols are visible in a reduced field of view and with a natural head position for the pilot due to the exocentricity without having to lean over the windshield, even when the aircraft is at a short distance from the landing zone. In addition, displaying the symbols at the same height relative to the aircraft terrain and the landing zone avoids parallax errors that can occur due to the exocentric three-dimensional display.

Depending on other advantageous aspects of the invention, the electronic display device includes one or more of the following characteristics, considered alone or according to all technically possible combinations:

the calculation module is further configured to compute an angle formed with the horizontal direction by an axis passing through the aircraft and the landing zone, the display device being configured to display the exocentric aircraft symbol and the first exocentric landing zone symbol only when a set of exocentric conditions are met, the set of exocentric conditions being at least a function of the distance between the aircraft and the landing zone according to the horizontal direction and the angle formed by the horizontal direction and the axis passing through the aircraft and the landing zone, the display device being further configured to implement a compliant display with respect to the landing zone of an approach landing zone symbol;

the device further comprises an adjustment module configured to acquire an adjustment value entered by the pilot, the display device being further configured to display the first exocentric landing zone symbol and the approach landing zone symbol at a height corrected from the acquired adjustment value;

the calculation module is further configured to calculate a longitudinal velocity of the aircraft relative to the terrain in a longitudinal direction of the aircraft and a lateral velocity of the aircraft relative to the terrain according to a lateral direction orthogonal to the longitudinal direction, the display device being further configured to display the longitudinal velocity and lateral velocity of the aircraft;

the display device is configured to display the exocentric aircraft symbol with an inclination relative to a horizontal plane orthogonal to the vertical direction, the inclination being a function of the aircraft roll;

the display device is configured to show a vertical bar that is representative of the height of the aircraft relative to the terrain, with the vertical bar extending in the direction of the terrain from the first exocentric landing zone symbol;

the display device is further configured to show at least one fixed height above the ground reference point on the vertical bar, each reference point being representative of a predetermined height above ground level; and the display device is configured to display a second exocentric landing zone symbol, with the vertical bar extending between the first and second exocentric landing zone symbols.

The invention also has as object, a method for displaying the exocentric symbols on a display system adapted to be carried on board an aircraft, the aircraft being adapted to fly over a terrain and land on a landing zone of the terrain, the display method comprising at least the following steps:

calculating a distance between the aircraft and the landing zone in a horizontal direction orthogonal to a vertical direction and determining a height of the aircraft relative to the terrain;

displaying on the display device an exocentric aircraft symbol at a said exocentric distance from the aircraft, positioned according to an exocentric direction and at a said exocentric height relative to the aircraft according to the vertical direction, the exocentric aircraft symbol being disposed between the terrain and the aircraft in the vertical direction, and displaying a first exocentric landing zone symbol, positioned at a distance from the landing zone equal to the exocentric distance according to the exocentric direction and at the same height as the exocentric aircraft symbol according to the vertical direction, the distance between the exocentric aircraft symbol and the first exocentric landing zone symbol according to the horizontal direction being equal to the distance between the aircraft and the landing zone according to the horizontal direction.

The invention also has as object a computer program comprising software instructions which, when executed by a computer, implement a display method as defined above.

BRIEF DESCRIPTION OF THE DRAWINGS

These features and advantages of the invention will become clearer upon reading the following description, given only as a non-limiting example, and by reference to the appended drawings, on which.

DETAILED DESCRIPTION

In the following, the term "vertical" is generally understood to be oriented according to the direction of the force of gravity. The term "horizontal" is generally understood to be perpendicular to the vertical direction, which is according to the direction of the force of gravity.

Figure 1:
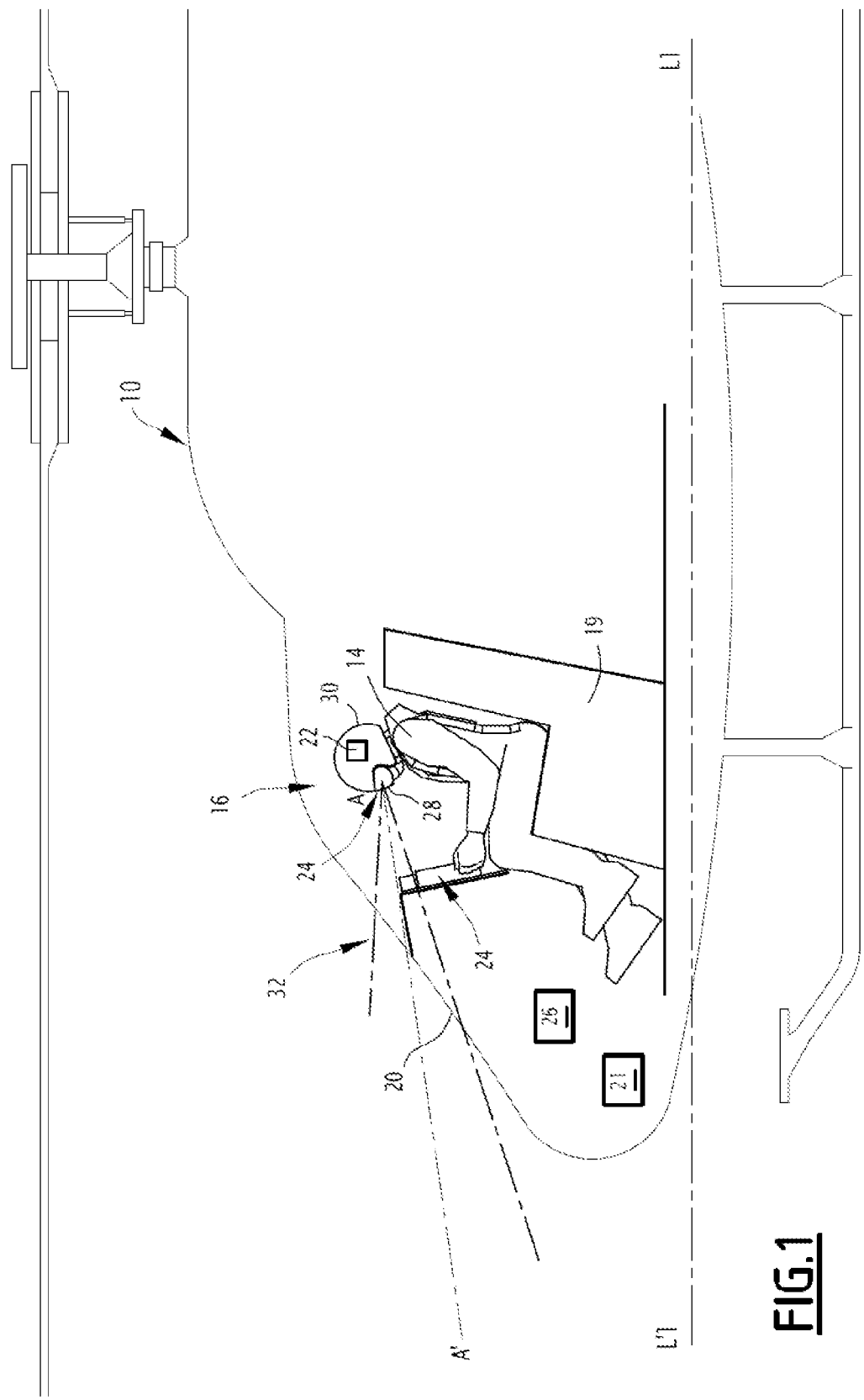
FIG. 1 is a schematic and side view of a cockpit of an aircraft.
Figure 2:
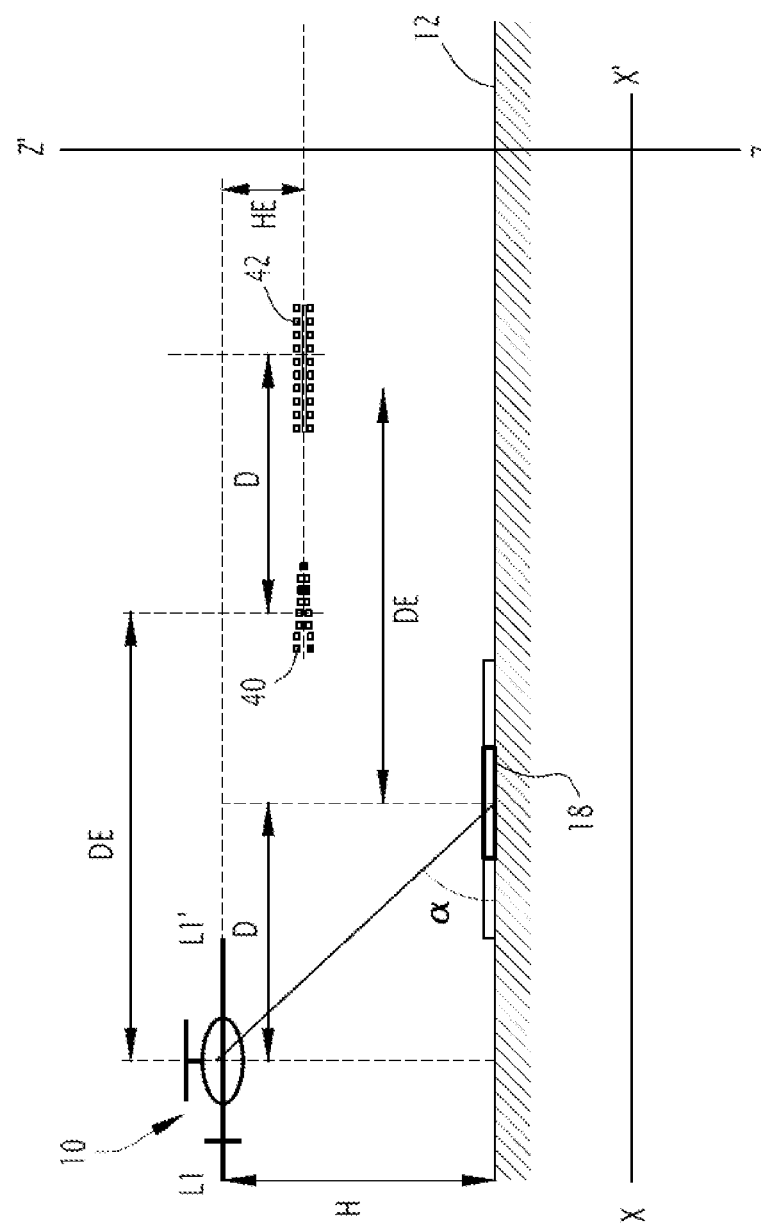
FIG. 2 is a schematic representation in a vertical plane of the aircraft of FIG. 1 and the landing zone.
Figure 3:
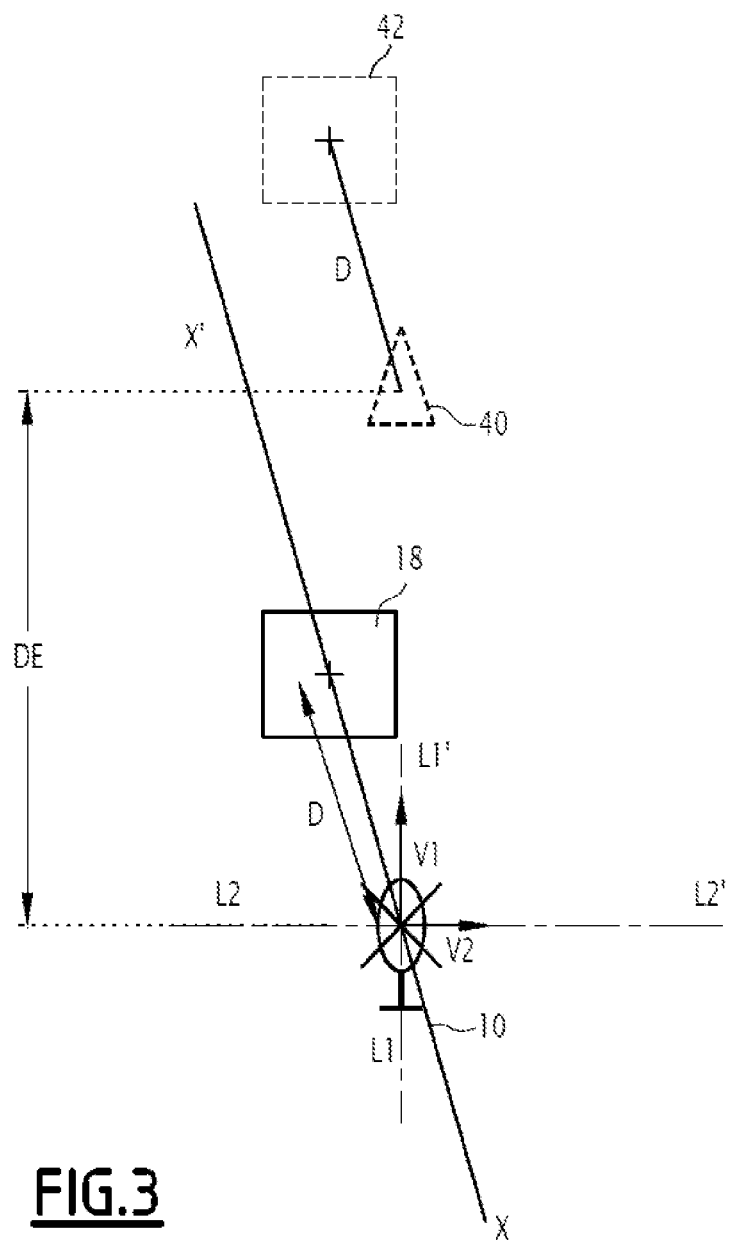
FIG. 3 is a schematic representation in a horizontal plane of the aircraft and the landing zone of FIG. 2.

An aircraft 10 flying over terrain 12 is shown in FIGS. 1 to 3.

The aircraft 10 is for example a helicopter, an airplane or a drone. In other words, the aircraft 10 is a flying machine piloted by a pilot 14 via a control station 16, the control station 16 being placed inside the aircraft 10 or at a distance from the aircraft 10, in particular in the case of a drone.

The aircraft 10 extends mainly according to a longitudinal direction. The longitudinal direction is also conventionally referred to as the roll axis of aircraft 10.

The aircraft 10 also defines a lateral direction L2-L2' orthogonal to the longitudinal direction. The lateral direction L2-L2' is also conventionally referred to as the pitch axis of the aircraft 10.

The aircraft 10 is suitable for landing on a landing zone 18 of the field 12 or for hovering, for example over the landing zone 18.

The landing zone 18 is, for example, an aerodrome, a runway, a heliport, an aircraft carrier or any predetermined geographical point on which the aircraft 10 is intended to land or over which the aircraft 10 is intended to hover. It is thus understood that the landing zone 18 presents in the form of a surface or geographical point.

The landing zone 18 is defined by geographical coordinates, such as latitude, longitude and altitude in a geodetic system.

In the case of a hover, a desired hover height is also defined.

The control station 16 is here a cockpit of the aircraft 10. As shown in FIG. 1, the control station 16 has at least one seat 19 for the pilot 14, at least one display unit, a windscreen 20 at least partially transparent separating the cockpit interior from the exterior environment of the aircraft 10, a positioning sensor 21 and an orientation sensor 22.

The display device comprises a display system and an electronic device 26 for displaying exocentric symbols on the display system.

The display system includes, for example, a display screen 24.

Alternatively, the display system is a holographic display device configured to show at least one three-dimensional image in front of the pilot 14 using the interference of two laser beams, without the need for a display screen.

In one embodiment, the display screen 24 is a head-up display screen. The head-up display 24 is at least partially transparent. Advantageously, the head-up display 24 is a visor 28 integrated in a helmet 30 that can be worn by the pilot 14, as shown in FIG. 1. Alternatively, the head-up display 24 is a transparent surface fixed in the cockpit and placed in front of the pilot 14.

Alternatively, or in addition, the display screen 24 is a head-down display. The head-down display screen 24 is a surface configured to display at least one image. Advantageously, the head-down display screen 24 is configured to display information relative to the aircraft 10, such as speed, height above the ground 12, orientation of the aircraft 10, and/or information relative to the external environment of the aircraft 10, such as air traffic information and weather conditions in the vicinity of the aircraft 10.

According to another embodiment, not shown, the aircraft 10 is a UAV (Unmanned Aircraft Vehicle) that can be remotely piloted via a control station 16, for example a ground control station, from which the UAV is piloted. The control station 16 includes here at least the seat 19 of the pilot 12 and the display screen 24 and at least one environment display screen, not shown. The environment display screen is configured to display the external environment of the aircraft 10 filmed from at least one camera onboard the UAV and/or to display a synthetic topographical rendering.

The orientation sensor 22 is capable of determining a viewing axis A-A' of the pilot 14. As can be seen in FIG. 1, the viewing axis A-A' relative to a predetermined horizontal and vertical angle defines a field of view 32 of the pilot 14.

The head-up display 24 is intended to be placed at least partially within the field of view 32 of the pilot 14.

The positioning sensor 21 is configured to determine the geographical position of the aircraft 10, in particular defined by geographical coordinates such as latitude, longitude and altitude in a geodetic system.

For example, the positioning sensor 21 uses a satellite positioning system.

The orientation sensor 22 is for example an accelerometer placed in the helmet 30 of the pilot 14 and able to determine the head posture of the pilot 14 from the accelerations measured in the helmet 30. The orientation sensor 22 is thus able to determine the viewing axis A-A' from the head posture of the pilot 14 and the orientation of the aircraft 10 received by at least one sensor on board the aircraft 10.

Alternatively, the orientation sensor 22 is an electromagnetic sensor able to determine the posture of the head of the pilot 14 from disturbances of a magnetic field due to the movement of the head of the pilot 14, according to a technique well known to the person skilled in the art.

Figure 5:
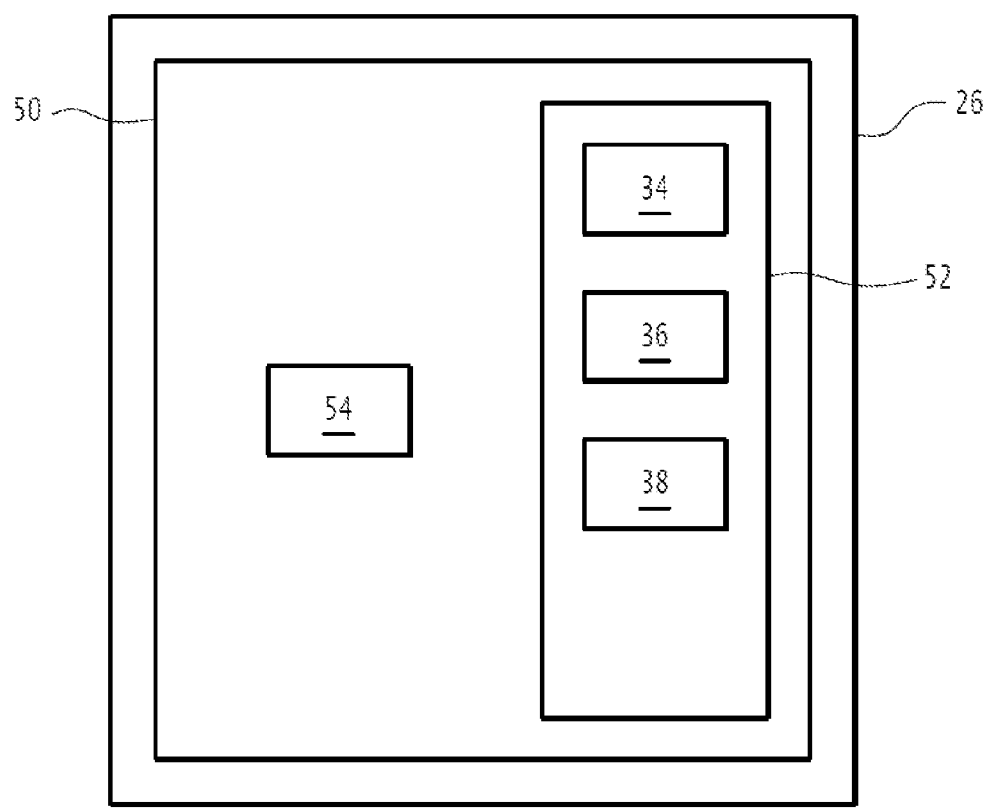
FIG. 5 is a schematic representation of an electronic display device according to the invention.

As seen in FIG. 5, the electronic display device 26 comprises a calculation module 34, a display module 36 and advantageously an adjustment module 38.

The calculation module 34 is configured to calculate a distance D between the aircraft 10 and the landing zone 18 according to a horizontal direction X-X' orthogonal to a vertical direction Z-Z'.

The distance D is calculated between a predetermined fixed point of the aircraft 10, for example the cockpit 16, and a predetermined fixed point of the landing zone 18, for example the center of the landing zone 18 or the beginning of the runway.

The horizontal direction X-X' extends between the aircraft 10 and the landing zone 18 in a horizontal plane. Thus, as seen in FIG. 3, the horizontal direction X-X' coincides with the longitudinal direction when the aircraft 10 is oriented towards the landing zone 18.

In particular, the calculation module 34 is able to calculate the distance D from the geographical coordinates of the landing zone 18 and the current position of the aircraft 10, known for example from the positioning sensor 21 embarked in the aircraft 10.

Alternatively, the calculation module 34 is able to directly calculate the distance D without going through the geographical position of the aircraft 10, for example by receiving a signal emitted from the landing zone 18.

In addition, the calculation module 34 is configured to determine a height H of the aircraft 10 in relation to the terrain 12.

The height is calculated conventionally along the vertical axis Z-Z'.

In particular, the calculation module 34 is able to calculate the height H from the measurement of a radio altimeter onboard the aircraft 10.

The calculation module 34 is also configured to calculate the angle $\alpha$ formed with the horizontal direction X-X' by an axis passing through aircraft 10 and the landing zone 18.

The more the aircraft 10 is above the landing zone 18, the closer the angle $\alpha$ is to 90°. Thus, when the angle $\alpha$ is close to 0°, the pilot 14 can easily see the landing zone 18 through the windshield 20 and therefore the visibility is maximum. Conversely, when the angle $\alpha$ is close to 90°, the aircraft 10 is located above the landing zone 18 and the pilot 14 has only partial visibility of the landing zone 18. Finally, when the angle $\alpha$ is greater than 90°, the aircraft 10 is moving away from the landing zone 18 and the pilot 14 therefore has no visibility of the landing zone 18. The angle $\alpha$ is therefore shown as being representative of the visibility of the landing zone 18 by the pilot 14 through the windshield 20 of the cockpit 16.

The calculation module 34 is also configured to determine a longitudinal speed of the aircraft V1 relative to the terrain 12 according to the longitudinal direction of the aircraft 10.

In addition, the calculation module 34 is configured to determine a lateral velocity V2 of the aircraft 10 relative to the terrain 12 in the lateral direction L2-L2'.

In an advantageous embodiment, the display module 36 is configured to verify a set of said exocentric conditions.

The set of exocentric conditions are at least a function of the distance D between the aircraft 10 and the landing zone 18 according to the horizontal direction X-X' and the angle $\alpha$ formed with the horizontal direction X-X' and the axis passing through the aircraft 10 and the landing zone 18.

For example, the display module 36 is configured to check the following exocentric conditions:
- the distance D between the aircraft 10 and the landing zone 18 in a horizontal direction X-X' is less than a threshold distance, and
- the angle $\alpha$ formed with the horizontal direction X-X' with the axis passing through the aircraft 10 and the landing zone 18 is within a predefined range.

The threshold distance and the predefined interval are determined from the geometry of the cockpit 16 of the aircraft 10 in such a way that when the set of exocentric conditions are respected, the pilot 14 does not see the landing zone 18 in his field of view 32 through the windshield 20. Thus, the threshold distance and the predefined range are representative of the visibility of the landing zone 18 by the pilot 14 and, as will be explained later, allow the display of the symbols on the display screen 24 to be adapted according to this visibility.

By "exocentric" is meant the fact of shifting the display referential of certain objects by a certain distance with respect to the real position, i.e., actual position, of these objects following at least one axis. Thus, an exocentric display of an object corresponds to a display of this object at a certain distance from the real position of this object and along at least one given axis.

Subsequently, the qualifiers "exocentric" or "exocentricity" are used to distinguish the elements to which these terms refer relative to other elements and have no particular meaning other than to designate the symbols that will be described later.

Alternatively, the display module 36 is configured to check one of the following two exocentric conditions:
- the distance D between the aircraft 10 and the landing zone 18 according to the horizontal direction X-X' is less than a threshold distance, or
- the angle α formed with the horizontal direction X-X' with the axis passing through the aircraft 10 and the landing zone 18 is within a predefined range.

As another alternative, the display module 36 is configured to check the following exocentric condition:
- the height H of the aircraft 10 is less than a threshold height,
- the distance D between the aircraft 10 and the landing zone 18 according to the horizontal direction X-X' is less than a threshold distance, and
- the angle α formed with the horizontal direction X-X' with the axis passing through the aircraft 10 and the landing zone 18 is within a predefined range.

Alternatively, or in addition, the set of exocentric conditions also depends on the speed of the aircraft, the set of exocentric conditions being then fulfilled when the speed of aircraft 10 is below a threshold speed.

Alternatively, or in addition, the set of exocentric conditions also depends on the orientation of the aircraft relative to the landing zone 18. In particular, the predefined range varies according to this orientation. In particular, the lower limit of the predefined range is higher when the landing zone 18 is located laterally relative to the aircraft 10 and the visibility of the pilot 14 is then better.

As an alternative or in addition, the set of exocentric conditions also depend on the direction of the viewing axis A-A' of the pilot relative to the horizontal direction X-X'. In particular, the set of exocentric conditions are fulfilled when the angle in a horizontal plane between the viewing axis A-A' and the horizontal direction X-X' is then less than a second predefined range.

When at least one of the said exocentric conditions is not met, the display module 36 is configured to implement a compliant display relative to the landing zone 18 of an approach landing zone symbol.

Indeed, when the aircraft 10 is at a significant distance D from the landing zone 18 and/or when the aircraft 10 is at low altitude, the pilot 14 has a satisfactory view of the landing zone 18 in his field of view 32 through the windshield 20. The compliant display of the approach landing zone symbol then allows the pilot 14 to make an easy approach to the landing zone 18.

Alternatively, the display module 36 is configured to implement a compliant display of the approach landing zone symbol relative to the landing zone 18 without taking into account the exocentric conditions, so that the pilot 14 always has this compliant display at his disposal.

Figure 4:
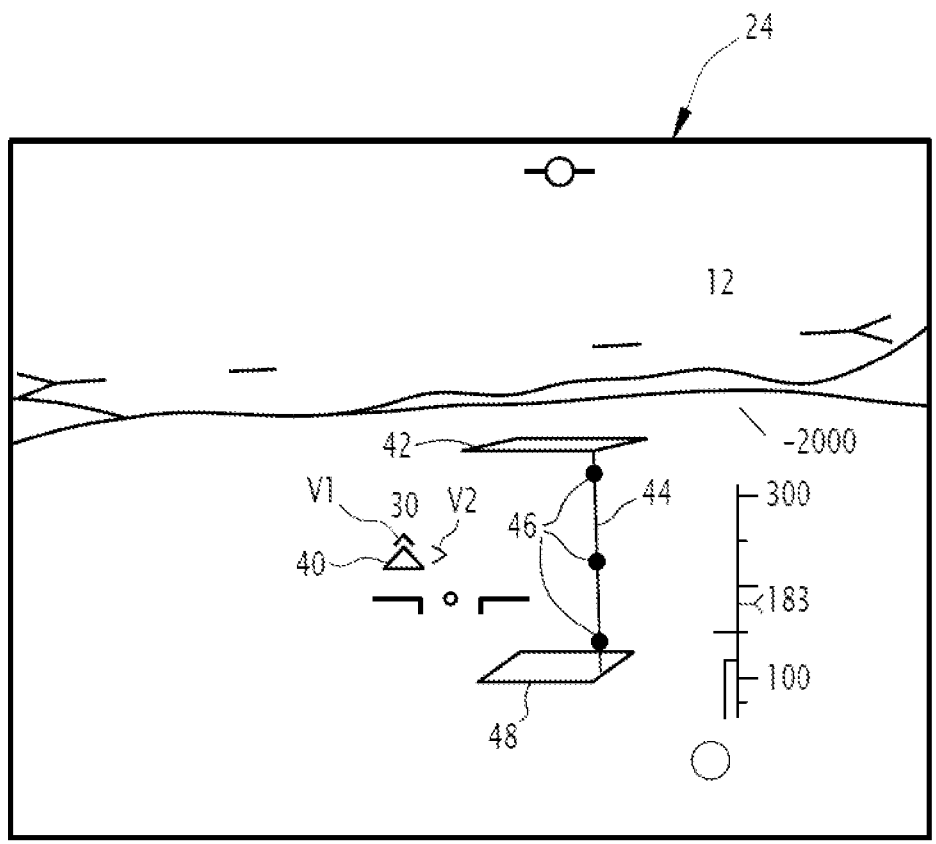
FIG. 4 is a representation of a view displayed on a display screen in the aircraft in FIG. 1.

When the set of exocentric conditions are respected, the display module 36 is configured to display, on the display system, an exocentric aircraft symbol 40, positioned at a said exocentric distance DE from the aircraft 10 according to an exocentric direction L1-L1' and at a said exocentric height difference HE relative to the aircraft 10 according to the vertical direction Z-Z', the exocentric aircraft symbol 40 being positioned between the terrain 12 and the aircraft 10 according to the vertical direction Z-Z', as shown in FIGS. 2 to 4.

In the example figures, the exocentric direction L1-L1' coincides with the longitudinal direction of the aircraft 10.

Alternatively, the exocentric direction L1-L1' forms an angle with the longitudinal direction of the aircraft 10 between 0° and 45°.

Advantageously, the exocentric direction L1-L1' varies with the orientation of the viewing axis A-A' 14 of the pilot.

The exocentric aircraft symbol 40 is thus a symbolic exocentric representation of the aircraft 10. As seen on FIG. 4, the exocentric aircraft symbol 40 is presented here as an example in the form of a triangle with one of its points oriented along the direction of exocentricity L1-L1' of the aircraft 10.

The display module 36 is further configured to display a first exocentric landing zone symbol 42, positioned at a distance from the landing zone 18 equal to the exocentric distance DE according to the exocentric direction L1-L1' of the aircraft 10 and at the same height as the exocentric aircraft symbol 40 according to the vertical direction Z-Z'.

The two exocentric symbols 40, 42 are thus displayed at the same height relative to the terrain 12, in order to avoid a parallax error for the pilot 14 who could visually perceive that the exocentric aircraft symbol 40 is aligned with the first exocentric landing zone symbol 42, without the aircraft 10 being actually above the landing zone 18.

The display of the exocentric aircraft symbol 42 at a height less than the height H of the aircraft 10 relative to the terrain 12 allows the pilot 10 to see the two exocentric symbols 40, 42 in perspective, in a comfortable manner without them being superimposed one in front of the other in the field of view 32 of the pilot 14.

The values for the exocentric distance DE and the exocentric height HE are determined from the geometry of the cockpit 16 and from flight tests. Based on the feedback from the pilot 14 during these tests, the values for the exocentric distance DE and the delta height HE are adjusted so as to provide the pilot 14 with the best possible exocentric display.

As seen in FIGS. 2 and 3, the distance D between the exocentric aircraft symbol 40 and the first exocentric landing zone symbol 42 according to the horizontal direction X-X' is equal to the distance D between the aircraft and the landing zone 18 according to the horizontal direction X-X'.

Thus, the display of the two exocentric symbols 40, 42 allows the pilot 14 to visualize the relative positions of the aircraft 10 and the landing zone 18 with the exact distance separating them.

Advantageously, the display module 36 is configured to display the exocentric aircraft symbol 40 with an inclination relative to a horizontal plane orthogonal to the vertical direction Z-Z', the inclination being a function of the roll of the aircraft 10 according to the exocentric direction L1-L1'. Thus, the inclination of the exocentric aircraft symbol 40 is dependent on the roll of the aircraft 10 so that the pilot 14 is aware of the position of the aircraft 10 before landing and can straighten it if necessary.

In an advantageous embodiment, the display module 36 is configured to additionally display a vertical bar 44 representative of the height H of the aircraft 10 relative to the terrain 12.

As seen in FIG. 4, the vertical bar 44 extends in the direction of the terrain 12 from the first exocentric landing zone symbol 42.

The pilot 14 can thus easily visualize the height H of the aircraft 10 relative to the terrain 12 and adjust his descent towards the landing zone 18 according to the said height H.

In addition, the display module 36 is also configured to show at least one fixed height reference point 46 relative to the terrain 12 on the vertical bar 44. Each reference point 46 is representative as a predetermined height level relative to the terrain 12.

In the case of a hover, the reference point 46 is used to show the height setpoint at which the aircraft 10 is expected to maintain its hover.

As seen in FIG. 4, three reference points 46 here represent, for example, heights of 10 m, 30 m and 50 m relative to the terrain 12. These reference points 46 are, for example, fixed heights defined in the landing procedure of the aircraft 10 where, in a conventional manner, the pilot 14 must perform checks of certain flight parameters, such as ground speed for example.

As an optional addition, the display module 36 is configured to display a second exocentric landing zone symbol 48.

The second exocentric landing zone symbol 48 is arranged so that the vertical bar 44 extends between the first exocentric landing zone symbol 42 and the second exocentric landing zone symbol 48.

Thus, the second exocentric landing zone symbol 48 is a translation, of the height H according to the vertical axis Z-Z' and downwards, of the first exocentric landing zone symbol 42.

This second exocentric landing zone symbol 48 helps the pilot 14 to better understand the height H which separates the aircraft 10 from the terrain 12, in order to facilitate the landing on the landing zone 18.

As an alternative or in addition, as seen in FIG. 4, the display module 36 is also configured to display the longitudinal speed V1 and the lateral speed V2 of the aircraft 10.

The pilot 14 can thus easily adjust the speed of the aircraft 10 to adapt the longitudinal speed V1 and obtain a lateral speed V2 of zero on landing.

The adjustment module 38 is configured to acquire an adjustment value entered by the pilot 14. The acquisition of this adjustment value is carried out, for example, by the pilot 14 moving a finger across the tactile head-down display 24.

Alternatively, the adjustment value is entered manually by the pilot from a human-machine interface device, such as a numerical keypad, a rotator or a button.

From this adjustment value, the display module 36 is further configured to display the first exocentric landing zone symbol 42 at a height relative to the terrain 12 corrected from the acquired adjustment value.

In particular, this adjustment value is positive or negative. When the adjustment value is positive, the first exocentric landing zone symbol 42 is displayed at a height greater than the initial display. Conversely, when the adjustment value is negative, the first exocentric landing zone symbol 42 is displayed at a lower height than the initial display.

Indeed, the geographical coordinates of the landing zone 18 may present a height different to the altitude provided to the display module 36 and the actual altitude of the landing zone 18. Thus the pilot 14 can adjust the height of the landing zone symbols, notably the approach landing zone symbol, so that the symbol that the pilot 14 visualizes on the display system corresponds to the actual terrain 12.

In addition, the adjustment module 38 is also configured to acquire a second adjustment value for the reference point 46 related to the height setpoint at which the aircraft 10 is supposed to maintain its hover.

From this second adjustment value, the display module 36 is further configured to display the related reference point 46 corrected from the second acquired adjustment value.

In the example in FIG. 5, the electronic display device 26 includes an information processing unit 50 formed for example by a memory 52 and a processor 54 related to the memory 52. The calculation module 34, the display module 36, and in optional addition the adjustment module 38, are each in the form of a software, or a software brick, executable by the processor 54. The memory 52 of the electronic display device 26 is then able to store a calculation software, a display software, and in optional addition, an adjustment software. The processor 54 is then able to execute each of these software programs.

In an optional variant not shown, the calculation module 34, the display module 36 and, as an optional addition, the adjustment module 38, are each in the form of a programmable logic component, such as an FPGA (Field Programmable Gate Array), or in the form of a dedicated integrated circuit, such as an ASIC (Application Specific Integrated Circuit).

When the electronic display device 26 is in the form of one or more software programs, i.e. a computer program, it is also suitable for storage on a computer-readable medium, not shown. The computer-readable medium is, for example, a medium capable of storing electronic instructions and of being coupled to a bus of a computer system. For example, the readable medium is an optical disk, magneto-optical disk, ROM, RAM, any type of non-volatile memory (e.g. EPROM, EEPROM, FLASH, NVRAM), magnetic card or optical card. On the readable medium is then stored a computer program with software instructions.

Figure 6:
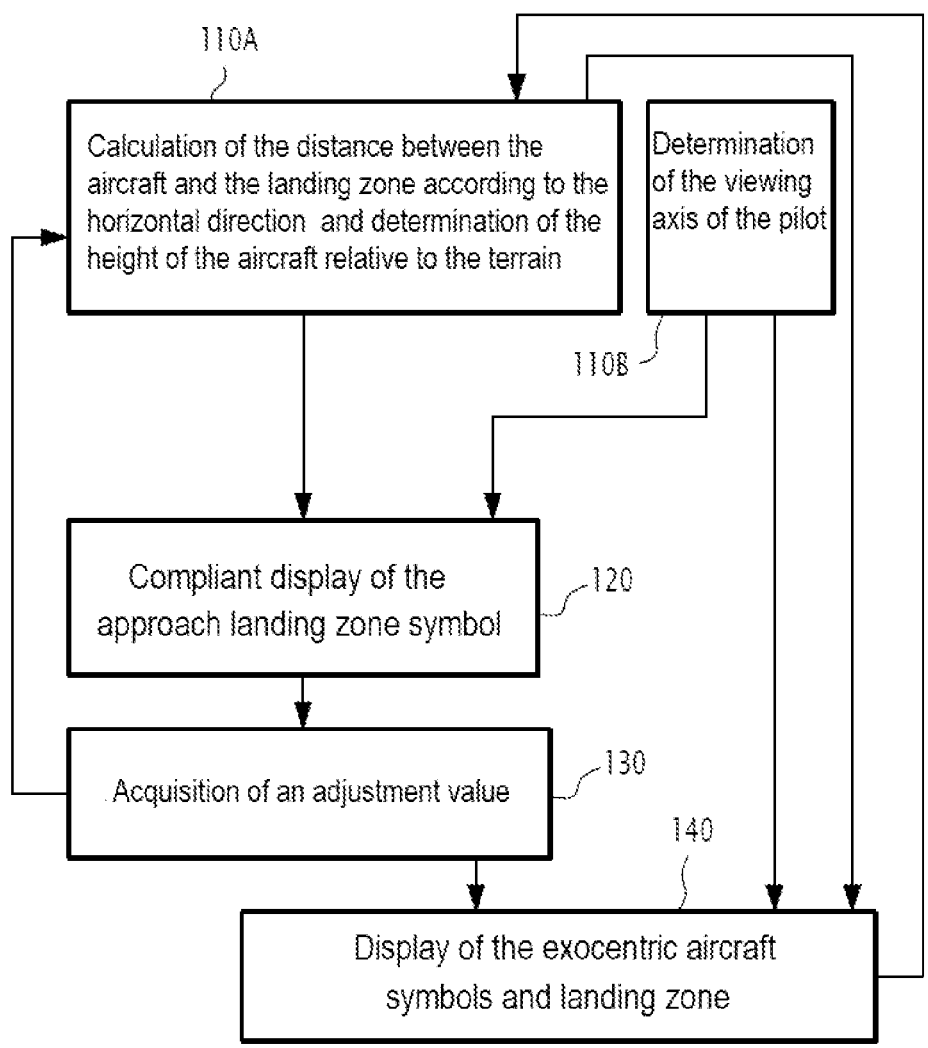
FIG. 6 is a flowchart of a display method according to the invention; the method being implemented by the electronic display device in FIG. 5.

The operation of the electronic display device 26 according to the invention will now be explained by means of FIG. 6 representative of a flow chart of the method, according to the invention, of displaying the exocentric symbols 40, 42, 48 on the display system, the method being implemented by the electronic display device 26.

Initially, the aircraft 10 flies over the terrain 12.

The aircraft 10 flies towards the landing zone 18 where the pilot 14 wishes to land or hover over it.

The aircraft 10 does not initially meet the exocentric conditions.

During a step 110A, the calculation module 34 calculates the distance D between the aircraft 10 and the landing zone 18 according to the horizontal direction X-X' and determines the height H of the aircraft 10 relative to the terrain 12, as shown in FIG. 2.

The step 110A is performed periodically to update the calculated D, H values during the flight of the aircraft 10.

During an optional step 110B, the orientation sensor 22 determines the viewing axis A-A' of the pilot 14.

Then, during a step 120, the display module 36 implements a compliant display relative to the landing zone 18 of the approach landing zone symbol.

During an optional step 130, the adjustment module 38 acquires an adjustment value entered by the pilot 14 allowing the adjustment of the approach landing zone symbol with the landing zone 18 actually seen by the pilot 14.

Then, a new iteration of step 120 is performed in order to display the approach landing zone symbol adjusted from the adjustment value.

Then, the aircraft 10 approaches the landing zone 18 and the set of exocentric conditions are then checked.

In a step 140, the display module 36 then displays, on the display system, the exocentric aircraft symbol 40 at the exocentric distance DE from the aircraft 10, positioned according to the exocentric direction L1-L1' and at the exocentric height difference HE relative to the aircraft 10 according to the vertical direction Z-Z', the exocentric aircraft symbol 40 being positioned between the terrain 12 and the aircraft 10 according to the vertical direction Z-Z', as shown in FIGS. 2 and 3.

The display module 36 also displays the first exocentric landing zone symbol 42, positioned at a distance from the landing zone 18 equal to the exocentric distance DE in the exocentric direction L1-L1' and at the same height as the exocentric aircraft symbol 40 in the vertical direction Z-Z'.

The distance D between the exocentric aircraft symbol 40 and the first exocentric landing zone symbol 42 is equal to the distance D between the aircraft 10 and the landing zone 18 according to the horizontal direction X-X'.

The display module 36 displays the exocentric aircraft symbol 40 and the approach landing zone symbol at a height relative to the ground 12 possibly adjusted with the adjustment value.

During step 140, as shown on FIG. 4, the display module 36 also advantageously shows the vertical bar 44 representative of the height H of the aircraft 10 relative to the terrain 12 and the second exocentric landing zone symbol 48. The vertical bar 44 extends in the direction of the terrain from the first exocentric landing zone symbol 42 to the second exocentric landing zone symbol 48.

Advantageously, the display module 36 also represents at least one fixed height reference point 46 relative to the terrain 12 on the vertical bar 44 to provide a reference to the pilot 14 relating to a height level relative to the terrain 12 for landing or a height at which the aircraft 10 is expected to maintain a hover.

Advantageously, the display module 36 also displays the longitudinal speed V1 and the lateral speed V2 of the aircraft 10, next to the exocentric aircraft symbol 40, as shown in FIG. 4.

Finally, thanks to the exocentric symbols 40, 42, 48, the pilot 14 is able to land the aircraft 10 more easily on the landing zone 18 or to easily maintain its stationary position above the landing zone 18.

It is then conceivable that the present invention presents a certain number of advantages.

Indeed, the electronic display device 26 according to the invention allows the pilot 14 to intuitively visualize the relative three-dimensional positions of the aircraft 10 and the landing zone 18, even when the landing zone 18 is positioned under the aircraft 10 and/or when view of the pilot 14 of the landing zone 18 is disturbed by night or weather conditions.

In particular, the display at the same exocentric height of the exocentric aircraft and landing zone symbols 40, 42 allows to overcome the parallax errors that can occur with conventional three-dimensional representations.

The exocentric symbols 40, 42, 48 are all visible in the field of view 32 of the pilot 14 with a natural head position, even when the aircraft 10 is at a short distance from the landing zone 18, thus reducing the cognitive load of the pilot 14.

Moreover, the exocentric representation of the symbols 40, 42, 48 does not hinder the direct visualization of the landing zone 18 by the pilot 14.

Finally, the electronic display device 26 according to the invention makes it possible to display the exocentric symbols 40, 42, 48 on the display system, whether it is head up or head down.

The invention claimed is:

1. An electronic display device for displaying exocentric symbols on a display system, the electronic display device and the display system being suitable for being embarked in an aircraft, the aircraft being suitable for flying over a terrain and landing on a landing zone of the terrain or for maintaining a hovering flight over this landing zone, the electronic display device comprising:
   a calculation module configured to calculate a distance between the aircraft and the landing zone according to a horizontal direction orthogonal to a vertical direction and to determine a height of the aircraft relative to the terrain; and
   a display module configured to display on the display system an exocentric aircraft symbol, positioned at an exocentric distance from an actual position of the aircraft according to an exocentric direction and at an exocentric height difference relative to the actual position of the aircraft in the vertical direction, the exocentric aircraft symbol being arranged between the terrain and the actual position of the aircraft according to the vertical direction,
   the display module being further configured to optionally display an actual aircraft symbol corresponding to the actual position of the aircraft,
   the display module being further configured to display a first exocentric landing zone symbol, positioned at a distance from an actual position of the landing zone equal to the exocentric distance according to the exocentric direction and at the same height as the exocentric aircraft symbol according to the vertical direction, and
   the display module being further configured to optionally display an actual landing zone symbol corresponding to the actual position of the landing zone,
   the distance between the exocentric aircraft symbol and the first exocentric landing zone symbol according to the horizontal direction being equal to the distance between the actual position of the aircraft and the actual position of the landing zone according to the horizontal direction.

2. The electronic display device according to claim 1, wherein the calculation module is further configured to calculate an angle formed with the horizontal direction by an axis passing through the actual position of the aircraft and the actual position of the landing zone,
   the display module being configured to display the exocentric aircraft symbol and the first exocentric landing zone symbol only when a set of exocentric conditions are met, the set of exocentric conditions being at least a function of the distance between the actual position of the aircraft and the actual position of the landing zone according to the horizontal direction and of the angle formed by the horizontal direction and the axis passing through the actual position of the aircraft and the actual position of the landing zone,
   the display module being furthermore configured to implement a compliant display relative to the landing zone of an approach landing zone symbol.

3. The electronic display device according to claim 2, further comprising an adjustment module configured to acquire an adjustment value entered by the pilot, the display module being further configured to display the first exocentric landing zone symbol and the approach landing zone symbol at a height corrected from the acquired adjustment value.

4. The electronic display device according to claim 1, wherein the calculation module is configured to further compute a longitudinal velocity of the aircraft relative to the terrain according to a longitudinal direction of the aircraft and a lateral velocity of the aircraft relative to the terrain according to a lateral direction orthogonal to the longitudinal direction, the display module being further configured to display the longitudinal speed and lateral speed of the aircraft.

5. The electronic display device according to claim 1, wherein the display module is configured to display the exocentric aircraft symbol with an inclination relative to a horizontal plane orthogonal to the vertical direction, the inclination being a function of a roll of the aircraft.

6. The electronic display device according to claim 1, wherein the display module is configured to display a vertical bar representative of the height of the actual position of the aircraft relative to the terrain, the vertical bar extending towards the terrain from the first exocentric landing zone symbol.

7. The electronic display device according to claim 6, wherein the display module is further configured to show at least one reference point of the fixed height relative to the terrain on the vertical bar, each reference point being representative of a predetermined height level relative to the terrain.

8. The electronic display device according to claim 6, wherein the display module is configured to display a second exocentric landing zone symbol, the vertical bar extending between the first and second exocentric landing zone symbols.

9. A display method for displaying exocentric symbols on a display system adapted to be embarked in an aircraft, the aircraft being adapted to fly over a terrain and land on a landing zone of the terrain or to maintain a hover over the landing zone, the display method comprising:
- calculating a distance between the aircraft and the landing zone according to a horizontal direction orthogonal to a vertical direction and determining a height of the aircraft relative to the terrain;
- display on the display system of an exocentric aircraft symbol at an exocentric distance from an actual position of the aircraft according to an exocentric direction and at an exocentric height difference relative to the actual position of the aircraft according to the vertical direction, the exocentric aircraft symbol being disposed between the terrain and the actual position of the aircraft in the vertical direction;
- optionally display an actual aircraft symbol corresponding to the actual position of the aircraft;
- display of a first exocentric landing zone symbol, positioned at a distance from an actual position of the landing zone equal to the exocentric distance according to the exocentric direction and at the same height as the exocentric aircraft symbol in the vertical direction; and
- optionally display an actual landing zone symbol corresponding to the actual position of the landing zone,
- the distance between the exocentric aircraft symbol and the first exocentric landing zone symbol according to the horizontal direction being equal to the distance between the actual position of the aircraft and the actual position of the landing zone according to the horizontal direction.

10. A non-transitory computer-readable medium including a computer program product having software instructions which, when implemented by computer equipment, implement a display method for displaying exocentric symbols on a display system adapted to be embarked in an aircraft, the aircraft being adapted to fly over a terrain and land on a landing zone of the terrain or to maintain a hover over the landing zone, the display method comprising:
- calculating a distance between the aircraft and the landing zone according to a horizontal direction orthogonal to a vertical direction and determining a height of the aircraft relative to the terrain;
- display on the display system of an exocentric aircraft symbol at an exocentric distance from an actual position of the aircraft according to an exocentric direction and at an exocentric height difference relative to the actual position of the aircraft according to the vertical direction, the exocentric aircraft symbol being disposed between the terrain and the actual position of the aircraft in the vertical direction;
- optionally display an actual aircraft symbol corresponding to the actual position of the aircraft;
- display of a first exocentric landing zone symbol, positioned at a distance from an actual position of the landing zone equal to the exocentric distance according to the exocentric direction and at the same height as the exocentric aircraft symbol in the vertical direction; and
- optionally display an actual landing zone symbol corresponding to the actual position of the landing zone,
- the distance between the exocentric aircraft symbol and the first exocentric landing zone symbol according to the horizontal direction being equal to the distance between the actual position of the aircraft and the actual position of the landing zone according to the horizontal direction.

* * * * *